Oct. 16, 1956 W. H. McKENZIE 2,766,471
CARBOLY TIPPED DOUBLE END INSERTED SCRAPER AND HANDLE
Filed March 16, 1952
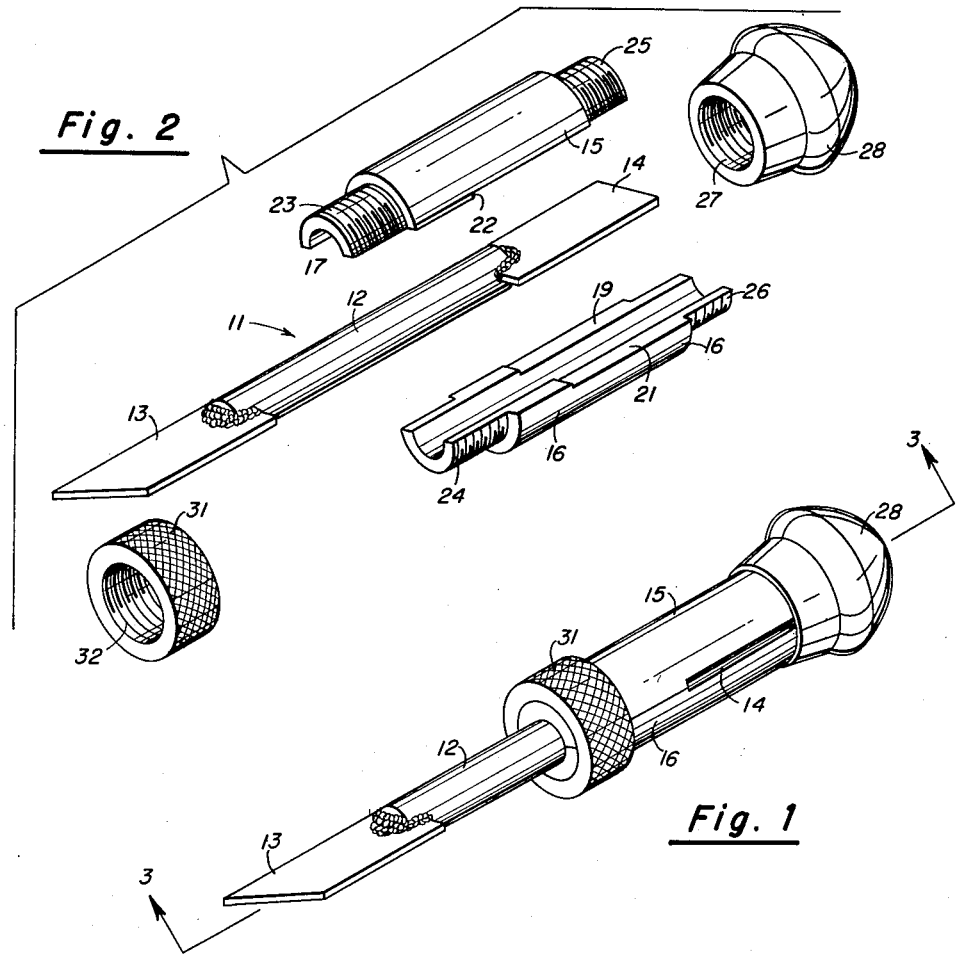
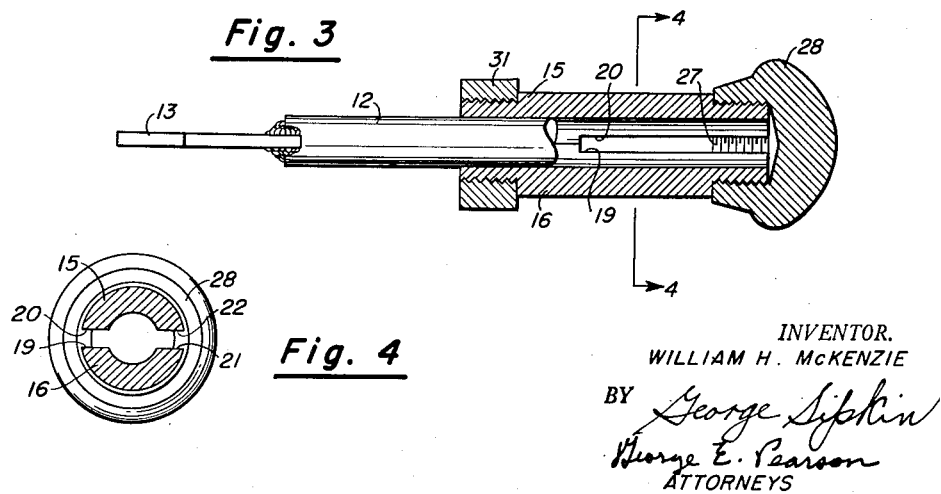
INVENTOR.
WILLIAM H. McKENZIE
BY George Sipkin
George E. Pearson
ATTORNEYS ID # United States Patent Office 2,766,471
Patented Oct. 16, 1956

2,766,471

CARBOLOY TIPPED DOUBLE END INSERTED SCRAPER AND HANDLE

William H. McKenzie, Long Beach, Calif.

Application March 16, 1954, Serial No. 416,726

3 Claims. (Cl. 15—105)

(Granted under Title 35, U. S. Code (1952), sec. 266)

The invention described herein may be manufactured and used by or for the Government of the United States of America for governmental purposes without the payment of any royalties thereon or therefor.

This invention relates to scraping and cutting tools and more particularly to a double ended scraper which is removable and reversible in a novel handle which provides a rigid protective support therefor.

Many devices have been used for scraping and cutting and frequently such tools are provided with a detachable handle or with means for reversing a double ended blade. Such former devices and tools, however, did not provide a firm and secure mounting for the tool, particularly when the tool was double ended and could be rotated or otherwise moved from one operating position to another. Furthermore, these double ended prior tools were not safe, since during use the concealed blade could move and severely injure the operator.

The present invention, as illustrated herein in one preferred embodiment, consists essentially of a double ended scraper and a four piece removable handle which houses the inoperative end of the scraper blade as well as providing a secure mounting for the scraper blade being used. The scraper blade itself preferably consists of an elongated, round, shank portion formed of mild steel and slotted at the opposite ends thereof to receive a pair of flat scraper elements provided with "Carboloy" tips, one scraping edge being perpendicular to the longitudinal axis and the other scraping edge preferably at a 45 degree or other acute angle to the longitudinal axis. The handle preferably consists of two elongated semi-cylindrical portions threaded at their opposite ends and provided with a central bore and recess to snugly receive approximately one half of the scraper blade. The threads at one end of the two elements of the handle which make up the cylindrical portion thereof are adapted to receive a cap member which is threaded thereon, and the threads at the opposite end are adapted to receive a knurled nut. The cap and nut firmly hold the parts of the handle in assembled relation and securely and rigidly mount the scraper blade for ready manipulation thereof.

One object of the present invention is to provide a rugged and rigid construction for a double ended scraper and handle therefor.

Another object of the present invention is to provide a handle for a double ended scraper which firmly and securely mounts the scraper blade and houses the inoperative cutting end to prevent injury to the hand while not in use.

A still further object of the present invention is to provide a novel double ended scraper blade which is inexpensive to construct and yet is provided with extremely hard and serviceable cutting edges, and is so constructed and mounted that either end can be readily utilized for scraping extremely hard metal with a maximum of safety and with optimum ease.

Other objects and many of the attendant advantages of this invention will be readily appreciated as the same becomes better understood by reference to the following detailed description when considered in connection with the accompanying drawings wherein:

Fig. 1 is a pictorial view of a double ended "Carboloy" tipped scraper and handle illustrating one preferred embodiment of the present invention, with the beveled scraping blade having its cutting edge formed at a 45 degree angle to the longitudinal axis extending from the composite handle;

Fig. 2 is an exploded view of the device illustrated in Fig. 1, showing the double ended scraper blade and the four parts of the composite handle;

Fig. 3 is a sectional view taken on the line 3—3 of Fig. 1; and

Fig. 4 is a sectional view taken on the line 4—4 of Fig. 3.

Referring now to the drawings in detail, the preferred embodiment of the double ended scraper and handle of the present invention consists of a double ended scraper 11 having an elongated round shank 12, slotted at each end, to receive flat scraper blades 13 and 14, which may be made easily removable as by a press fit or may be secured to the shank 12 by brazing or welding. The scraper blades 13 and 14 are provided with a "Carboloy" tip or edge portion which may be fused onto the material of the blade 13 or 14 or is secured thereto by a suitable joint. The shank 12 and the major portion of the blades 13 and 14 are preferably formed of a strong rigid but inexpensive material such as mild steel and only the cutting edges formed of a relatively hard tough material such as "Carboloy" or equivalent abrasive resistant material suitable for cutting and scraping extremely hard metal surfaces. "Carboloy" may be any one of a number of cemented carbides such as tungsten carbide, tantalum carbide and titanium carbide which may be used alone, mixed or alloyed with cobalt in various percentages depending on the particular use thereof.

The handle portion consists of two identical semi-cylindrical portions 15 and 16, each provided with elongated grooves 17 and 18, which together form an axial bore through the handle when the portions 15 and 16 are fitted together as shown in Figs. 1 and 3.

The portions 15 and 16 are also cut away at their outer ends as indicated at 19, 20, 21 and 22 to provide a transverse slot therethrough to receive either one of the flat scraper blades 13 and 14 when in the inoperative position.

The opposite ends of the two semi-cylindrical portions 15 and 16 are threaded as indicated at 23, 24, 25 and 26, the threaded portions 25 and 26 together engaging the internal threads 27 on the cap 28 which provides a suitably rounded surface for engagement by the hand of the operator to exert pressure on the scraping blade and also serves to hold the parts 15 and 16 to the handle in assembled relation together with the knurled nut 31, which is also provided with internal threads 32 to engage the threaded portions 23 and 24. The width of the blades 13 and 14 is slightly less than the internal diameter of the cap 28 and the nut 32 to permit assembly of the handle portions 15 and 16 on the scraper 11 and to permit the blades to extend into and abut the bottom of the internal bore of the cap 28 to prevent longitudinal movement of the scraper within the handle.

It will be apparent from a consideration of the drawings that the scraper 11 can be readily removed from the handle by unscrewing the cap 28 and the nut 31 and can be reversed to expose the opposite ends for use whenever desired. While one of the blades, such as 14, is in its inoperative position, the cutting edges are completely housed within the handle so that it would be impossible for the workman using the tool to cut his hand during the scraping operation, the sides of the blade portion 14 being recessed with respect to the outer surfaces of the transverse slot provided by assembly of the handle portions 15 and 16 as shown in Fig. 1.

Since the especially hard tips of the blades are difficult to sharpen when the cutting edges are dulled, and requires the use of a particular grinding wheel, it may be desirable to keep a supply of sharp cutting blades available and replace them when dull, or it may be advantageous to use blades of different shapes and sizes for different jobs. By brazing the blades in position in the slots in the shank 12 the blades such as 13 and 14 will drop out when heated sufficiently, and new sharp blades can be brazed in the slots in shank 12.

Obviously many modifications and variations of the present invention are possible in the light of the above teachings. It is therefore to be understood that within the scope of the appended claims the invention may be practiced otherwise than as specifically described.

What is claimed is:

1. A tool of the class described comprising a double ended scraper element having an elongated shank portion and relatively flat wide scraper blades secured to the opposite ends of said shank portion, an axially split handle comprising a pair of separate complementary sections having axial grooves therein and portions adjacent one end thereof cut away to form a transverse slot and shoulder adapted to receive one of said scraper blades with said shoulder abutting one end of said one blade, and means adapted to engage the opposite ends of both of said sections for releasably securing said sections together.

2. A tool of the class described comprising a double ended scraper element having an elongated shank portion and scraper blades secured to the opposite ends of said shank portion, a handle comprising a pair of complementary sections shaped and adapted to snugly receive one of said blades between the ends of said handle, the opposite ends of said handle sections being threaded externally, an internally threaded cap adapted to engage the threaded portions on both of said sections at one end of the handle, and a nut adapted to engage said threaded portions on both sections at the other end of the handle.

3. A tool of the class described comprising a double ended scraper element having an elongated shank portion and relatively flat wide scraper blades removably secured to the opposite ends of said shank portion, a handle comprising a pair of substantially semi-cylindrical sections having axial semi-circular grooves therein and mating, abutting edges, portions of said edges adjacent one end of said handle being cut away to form a transverse slot and shoulder adapted to receive one of said scraper blades with said shoulder abutting an inner end of said one blade, the opposite ends of said handle sections being threaded externally, an internally threaded cap adapted to engage the threaded portions on both of said sections at one end adjacent said transverse slot, and a knurled nut adapted to engage said threaded portions on both sections at the opposite end thereof.

References Cited in the file of this patent
UNITED STATES PATENTS

| | | |
|---|---|---|
| 80,378 | Wright | July 28, 1868 |
| 1,812,482 | Hill | June 30, 1931 |